United States Patent
Moore

Patent Number: 5,727,324
Date of Patent: Mar. 17, 1998

[54] CHALK BOX WITH ARCHED NECK

[76] Inventor: Jeffery Moore, Rte. 1, Box 200, Fuquay-Varina, N.C. 27526

[21] Appl. No.: 55,573

[22] Filed: May 3, 1993

[51] Int. Cl.[6] ............................................. B44D 3/38
[52] U.S. Cl. ............................................ 33/414; 401/9
[58] Field of Search ............................. 401/10; 33/414, 33/392, 393, 761, 768, 769; D10/72

[56] References Cited

U.S. PATENT DOCUMENTS

| | | | |
|---|---|---|---|
| 85,202 | 12/1868 | Beyl | 33/414 |
| D. 203,411 | 1/1966 | Quenot | D10/72 |
| D. 266,746 | 11/1982 | Wilson et al. | D10/72 X |
| D. 334,717 | 4/1993 | Evans, Jr. et al. | D10/72 |
| D. 337,787 | 7/1993 | Oga et al. | D10/72 |
| D. 341,329 | 11/1993 | Morris | D10/72 |
| 660,672 | 10/1900 | Vernon | 33/414 |
| 665,119 | 1/1901 | Latter | 33/414 |
| 1,169,413 | 1/1916 | Lyons | 33/761 |
| 2,110,210 | 3/1938 | Evans | 33/769 |
| 2,347,273 | 4/1944 | Lyle | 33/769 X |
| 2,589,500 | 3/1952 | Landon et al. | 33/414 X |
| 2,673,398 | 3/1954 | Baumgart | 33/414 |
| 4,192,078 | 3/1980 | Lore et al. | 33/414 |
| 4,197,656 | 4/1980 | Lane et al. | 33/414 |
| 5,042,159 | 8/1991 | Millen | 33/414 |

FOREIGN PATENT DOCUMENTS

| | | | |
|---|---|---|---|
| 9360 | 8/1900 | Norway | 33/414 |
| 74619 | 8/1947 | Norway | 33/414 |
| 2081898 | 2/1982 | United Kingdom | 33/392 |

*Primary Examiner*—Steven A. Bratlie
*Attorney, Agent, or Firm*—Rhodes, Coats, & Bennett, LLP

[57] ABSTRACT

A chalk box having a generally teardrop-shaped main body section and an arched neck section extending forwardly from the main body section. A reel containing a line is rotatably mounted within the case. The line exits the case through in aperture at the forward end of the neck section. The line exits through the aperture at an angle relative to the longitudinal axis of the case. The configuration of the case makes the chalk box of the present invention less awkward to use than prior art chalk boxes. Also, the case may be provided with a hook lying along the longitudinal axis of the case. When the line is engaged with the hook and the case is suspended at the end of the line, the chalk box functions as a plum bob.

2 Claims, 2 Drawing Sheets

CHALK BOX WITH ARCHED NECK

FIELD OF THE INVENTION

The present invention is related generally to marking devices used in construction for marking a straight line, and more particularly to a chalk box containing a line covered with powdered chalk.

BACKGROUND OF THE INVENTION

Chalk lines are widely used in the building industry for marking straight lines on floors, walls and roofs. The chalk line is wound on a reel or spool which is contained in a case. The case is filled with a powdered chalk which coats the line. The free end of the line extends through an opening in the case.

In use, the free end of the chalk line is held at a first position and the chalk line is reeled out and held at a second location. The ends of the chalk line are placed against a surface to be marked and the chalk line is stretched taut. The center of the chalkline is then snapped by raising the center of the chalk line and releasing it. When the chalk line strikes the surface, a chalk mark is left on the surface.

The most commonly used chalk box has a teardrop-shaped case and is awkward to handle. Accordingly, when using the teardrop-style chalk box, workers usually unreel more line than is necessary and wrap a portion of the line around their finger to hold it against the surface.

SUMMARY AND OBJECTS OF THE INVENTION

The present invention is a chalk box which is ergonomically designed and less awkward to use than prior art chalk boxes. The chalk box includes a case, a reel rotatably mounted within the case, and a line wound on the reel.

The chalk box includes an opening through which a powdered chalk is introduced into the case. A crank is mounted on the outside of the case and operatively connected to the reel for rewinding the line on the reel.

The case has a teardrop shaped main body portion which houses the reel, and an arched neck which extends forwardly from the main body portion and curves to one side. The main body portion is formed with a pointer which lies along a longitudinal axis of the chalk box. The chalk line exits through an opening in the forward end of the neck at an angle relative to the longitudinal axis. With this configuration, it is easy to hold the chalk line against the surface to be marked by simply placing the forward end of the neck against the surface. There is no need to reel out an excess amount of line, or to wrap a portion of the line around one's finger. Thus, the arched neck substantially increases the user's control over the chalk box as compared to the traditional tear-drop design.

In another aspect of the present invention, a hook is mounted on the outside of the case in line with the longitudinal axis of the case and the center of gravity of the chalk box. When the chalk line is wrapped around the case and engaged with the hook, the chalk box can be used as plumb bob.

Based on the foregoing, it is a primary object of the present invention to provide a chalk box which is ergonomically designed and less awkward to use than prior art chalk boxes.

Another object of the present invention is to provide a chalk box which can also be used as a plumb bob.

Other objects and advantages of the present invention will become apparent and obvious from a study of the following description and the accompanying drawings which are merely illustrative of such invention.

DETAILED DESCRIPTION OF THE INVENTION

Figure 1:
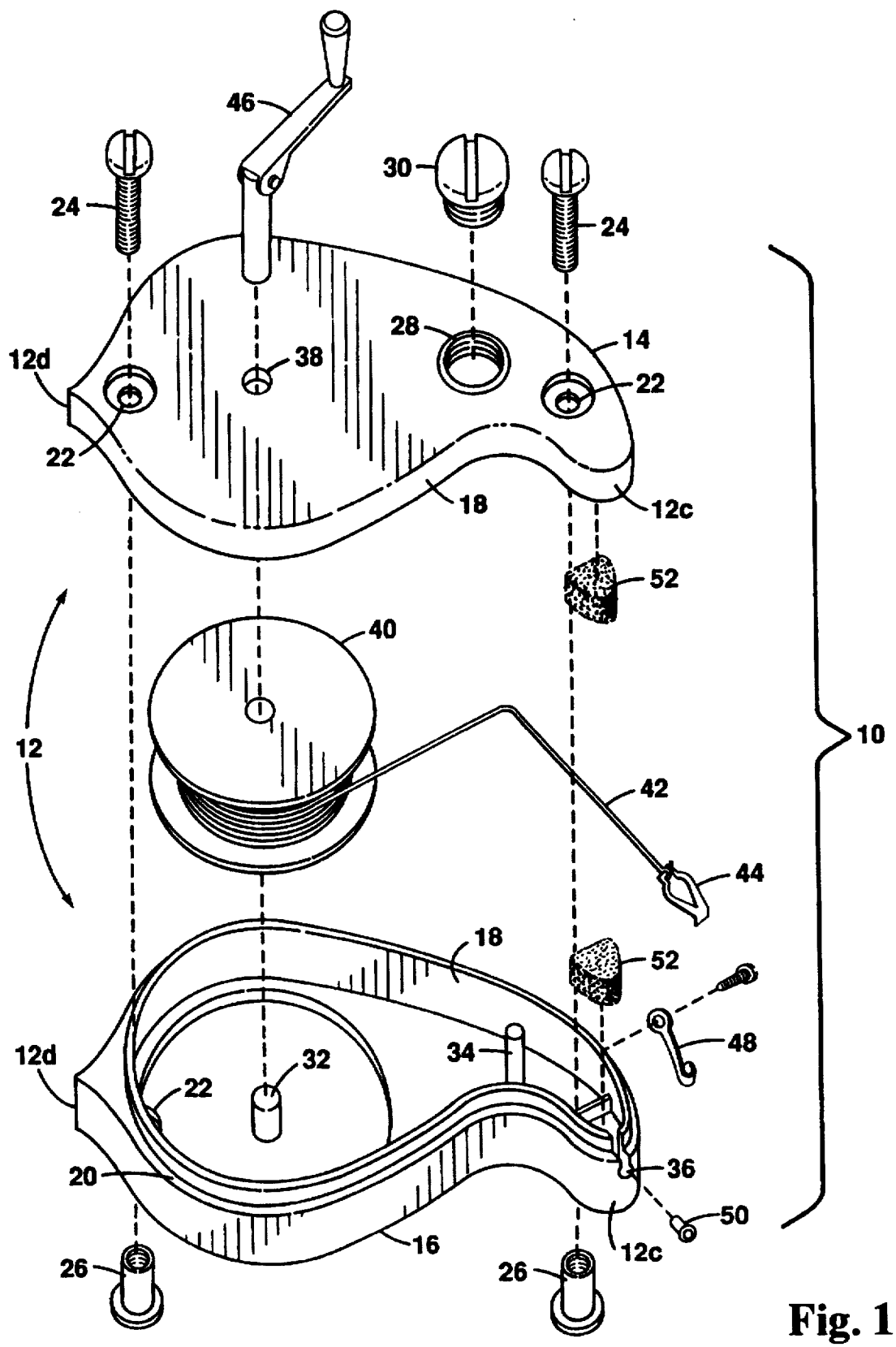
FIG. 1 is an exploded view of the invention.

Referring now to FIG. 1, the chalk box of the present invention is shown therein and indicated generally by the numeral 10. The chalk box includes a case 12, a reel 40 mounted with the case 12, and a line 42 wound on the reel 40.

Figure 2:
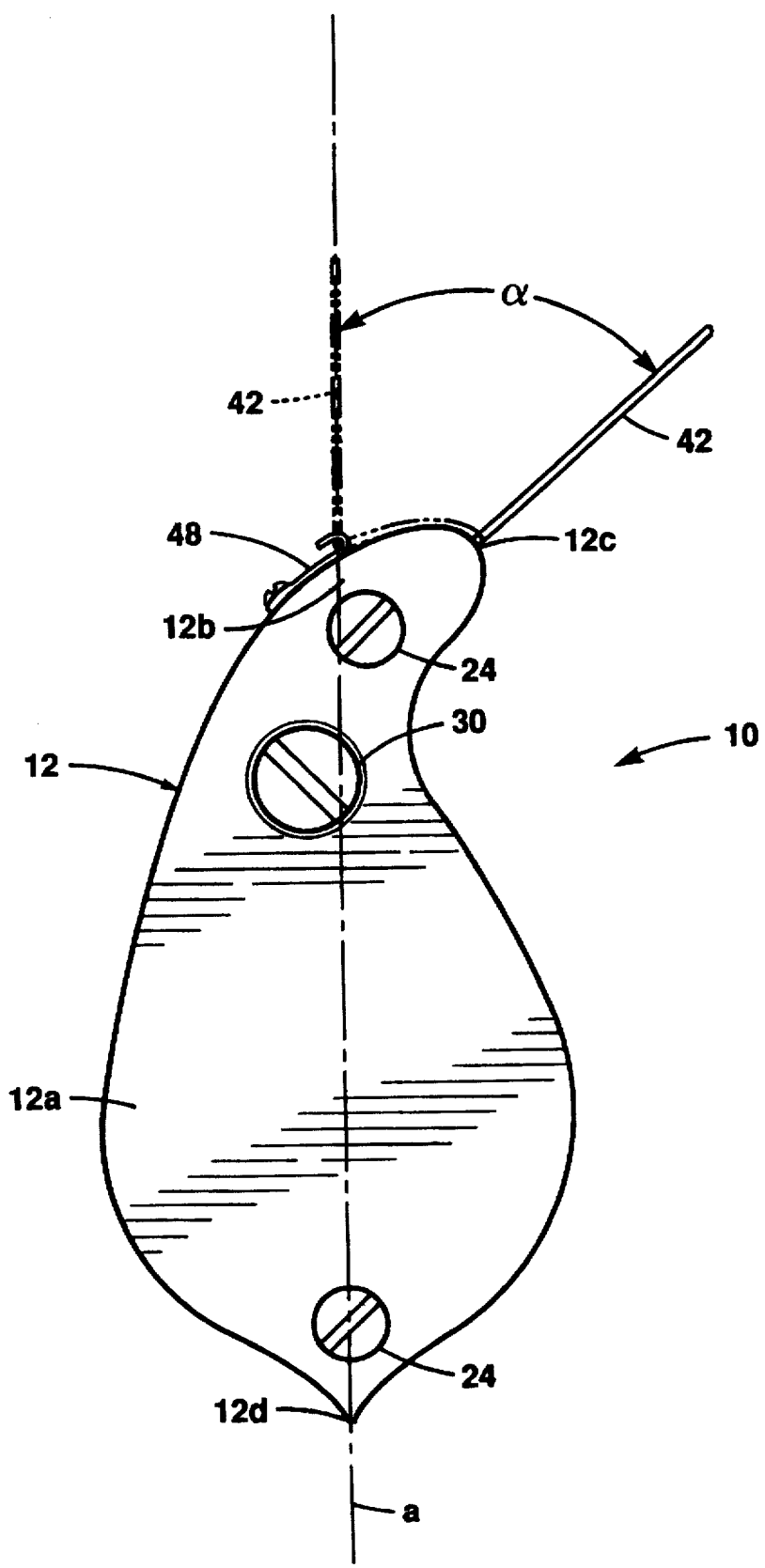
FIG. 2 ia a side view of the invention.

The case 12 has a teardrop-shaped main body section 12a and an arched neck section 12b extending forwardly from the main body section 12a. The main body section 12a includes a point 12d. The neck section 12b curves to one side and terminates in a forward end 12c. An aperture 36 is formed at the forward end 12c of the neck section 12b. The line 42 exits the case 12 at an angle $\alpha$ relative to the longitudinal axis a of the case 12. (See FIG. 2).

The case 12 is made in two sections 14, 16. Lower section 16 includes a peripheral wall 18 having a shoulder 20 which is overlapped by the peripheral wall 18 of section 14. Each section 14, 16 includes a pair of co-axially aligned holes 22. A fastener, consisting of a screw 24 and barrel nut 26, extends through the co-axially aligned holes 22 to secure the sections 14, 16 together.

A first section 14 of the case 12 includes a fill hole 28 for introducing powdered chalk into the closed case 22. A fill plug 30 threads into engagement with the fill hole 28. A stud member 32 is formed on one section 14, 16 for mounting a reel 40. A line 42 is wound on the reel and passes through an aperture 36 at the forward end of the neck portion 12b of the case 12. A grommet 50 is fitted into the aperture. The line 42 passes around a guide pin 34 and passes between a pair of felt pads 52. The felt pads 52 function to wipe off excess chalk as the line is unreeled. A crank 46 for rewinding the line 42 is attached to the reel 40 and passes through a crank opening 38 in section 14.

In another aspect of the invention, a hook 48 is secured to the exterior of the case 12 in alignment with the longitudinal axis of the case 12. The hook 48 facilitates use of the chalk box 10 as a plumb bob as hereinafter described.

In use, the line 42 is wound on the reel 40 and rotatably mounted in the case 12. The two sections 14, 16 of the case are assembled together. The fill plug 30 is removed and powdered chalk is introduced into the case through the fill hole 28.

To mark a line on a surface, the hook 44 at the end of the line 42 is engaged with the surface to be marked and a portion of the line 42 is unreeled. The line 42 is then held against the surface by pressing the forward end 12c of the neck portion 12b against the surface. Due to the unique configuration of the chalk box 10, there is no need to unreel an excess amount of line, or to wind a portion of the line around one's finger to hold it against the surface. The line is then pulled taut and snapped to leave a mark on this surface. The crank 46 is used to wind the line 42 back on the reel 40.

The chalk box 10 can also be used as a plumb bob. To use the chalk box 10 as a plumb bob, a portion of the line 42 is unreeled, wrapped around the outer surface of the chalk box 10 and engaged with the hook 46 as shown in dotted lines in FIG. 2. Because the hook 48, pointer 12d, and center of gravity all fall along the same line, the point 12d on the main body section 12a will be pointed downwardly along a vertical line when the case 12 is suspended at the end of the line 42.

The present invention may, of course, be carried out in other specific ways than those herein set forth without departing from the spirit and essential characteristics of the invention. The present embodiments are, therefore, to be considered in all respects as illustrative and not restrictive and all changes coming within the meaning and equivalency range of the appended claims are intended to be embraced therein.

What is claimed is:

1. A chalk box comprising:

(a) a case having a hollow cavity, said case including a generally teardrop-shaped main body section having a longitudinal axis and an arched neck joining the main body section along its longitudinal axis, wherein the arched neck extends forwardly from said main body section and curves to one side thereof;

(b) a line aperture formed at a forward portion of the neck communicating with the interior of the case;

(c) a reel rotatably mounted within main body section of the case; and (d) a line wound on the reel and extending through the aperture in the case, said line exiting the case at an angle relative to the longitudinal axis of the case.

2. The chalk box according to claim 1 further including a pointer formed in the main body section of the case and a hook mounted to the exterior of the case, said pointer and said hook laying along a line extending through the center of gravity of the case to facilitate use of the case as a plumb bob.

* * * * *